No. 732,469. Patented June 30, 1903.

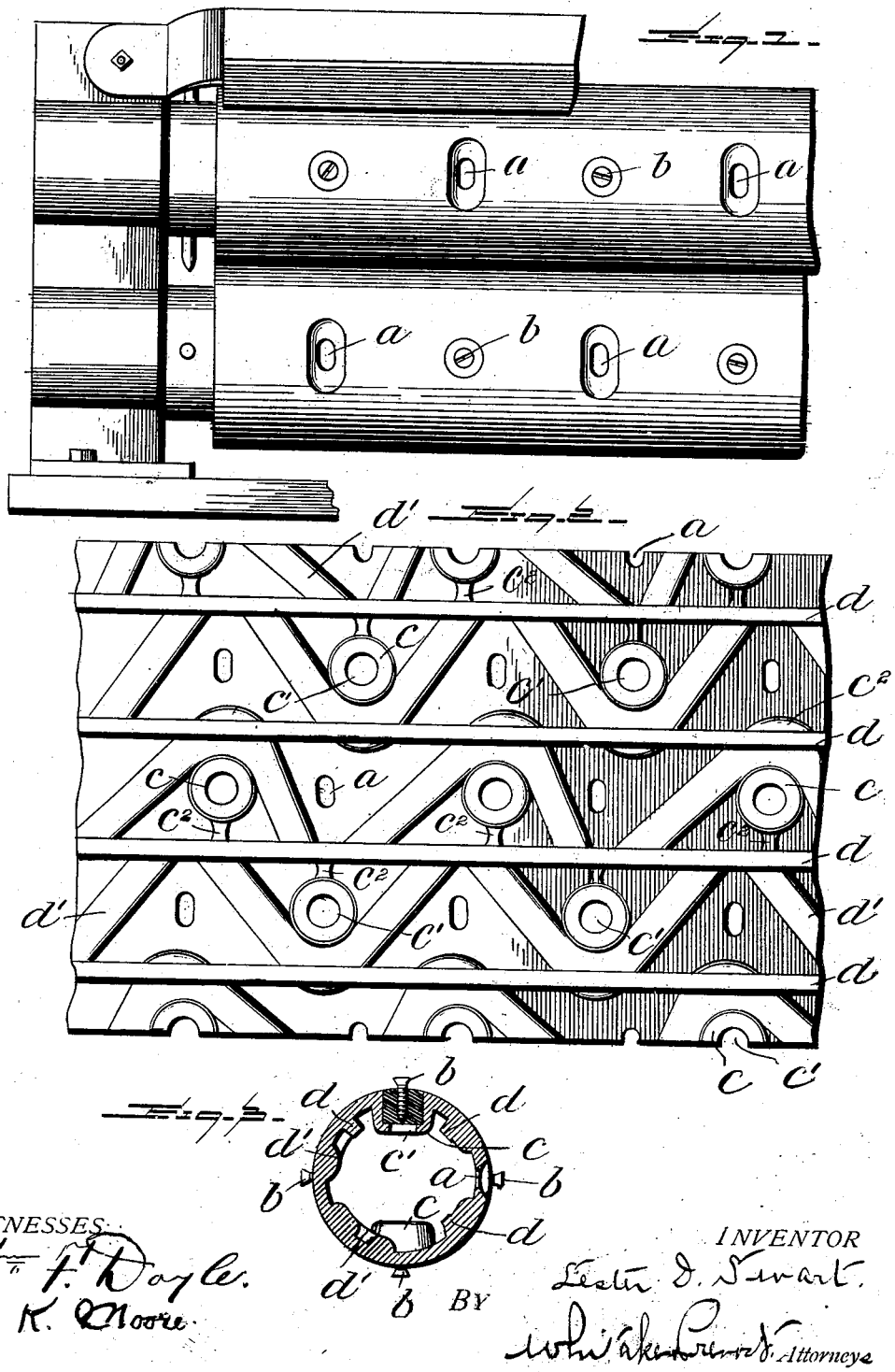

UNITED STATES PATENT OFFICE.

LESTER D. SWART, OF AUBURN, NEW YORK.

ROLLER FOR CORN-HUSKING MACHINES.

SPECIFICATION forming part of Letters Patent No. 732,469, dated June 30, 1903.

Application filed January 19, 1903. Serial No. 139,673. (No model.)

*To all whom it may concern:*

Be it known that I, LESTER D. SWART, a citizen of the United States, residing at Auburn, in the county of Cayuga and State of New York, have invented certain new and useful Improvements in Rollers for Corn-Husking Machines; and I do hereby declare the following to be a full, clear, and exact description of the invention, such as will enable others skilled in the art to which it appertains to make and use the same.

My present invention is in the class of corn-husking machines; and it consists more particularly in an improved form of husking-roller whereby I am enabled to make such rollers of greatly less weight, and thus reduce cost as well as making the machine considerably lighter.

Figure 1 is a partial top view of two rollers of a husking-machine. Fig. 2 is a view of the interior of a roller developed. Fig. 3 is a transverse sectional view.

My improved roller is made hollow and is provided on the interior with certain interiorly-extending projections and flanges and ridges to afford the means for securing the teeth of the rollers and strengthening the roller, so that it will be as effective and lasting as a roller made in the usual way. When placed in the machine, these rollers are geared together so that they will move in unison, and each roller is provided with a longitudinally-extending series of holes $a$ and teeth $b$, disposed alternately, as shown in the drawings. The teeth of each of the rollers are arranged to enter the holes of its adjacent roller. The teeth consists each of a screw or a screw-headed pin set in an elastic cushion or packing, which is in turn sealed in a recess of the roller. As the depth of these recesses is greater than the thickness of the outer wall of my improved roller, I provide certain interiorly-extending rounded projections $c$, which are hollowed exteriorly, forming sockets, and are provided with the central opening $c'$ of a less size, connecting the interior of the socket with the interior of the roller. The elastic cushion or packing is inserted in the exterior opening and the screw or screw-headed pin inserted. The central opening $c'$ permits of the use of screws or pins which may not have been reduced to an exact length and at the same time enables the packing to be reached from the interior of the roller if it be found difficult to remove in any other way. The roller is further provided interiorly with the longitudinal ribs or flanges $d$ and the zigzagged ribs or flanges $d'$. Each one of the rounded inward projections $c$ is in an angle of the rib $d'$, so that the said projection is partly embraced and strengthened by said rib and is connected to one of the longitudinal flanges by a short rib $c^2$, thus forming a roller of great strength with great economy of material and with a great reduction in the weight of this class of devices.

What I claim, and desire to secure by Letters Patent, is—

1. A tubular or hollow roller for corn-husking machines having interiorly-rounded projections hollowed exteriorly to form sockets, said sockets communicating with the interior of the roller by openings of less diameter than the sockets, substantially as described.

2. A tubular or hollow roller for corn-husking machines, having interiorly-extending rounded projections hollowed exteriorly forming sockets each adapted to receive an elastic packing and having the interior strengthening-ribs of a zigzag form partly embracing said rounded projections, substantially as described.

3. A tubular or hollow roller for corn-husking machines having interior longitudinal strengthening-ribs and a series of rounded projections between said ribs hollowed exteriorly each forming a socket to receive an elastic packing, substantially as described.

4. A tubular or hollow roller for corn-husking machines having on its interior longitudinal strengthening-ribs, zigzag ribs connecting said longitudinal ribs and a series of rounded projections in the angles of said zigzag ribs, substantially as described.

5. A tubular or hollow roller for corn-husking machines, having on its interior longitudinal ribs, zigzag ribs connecting said longitudinal ribs, rounded projections in angles of said zigzag ribs which engage one side of said rounded projections and a short rib connecting said rounded projections directly with one of the longitudinal projections, substantially as described.

In testimony whereof I affix my signature in the presence of two witnesses.

LESTER D. SWART.

Witnesses:
AUG. P. COGSWELL,
MAUDE E. EDDY.